United States Patent
Nihei (10) Patent No.: US 6,208,987 B1
(45) Date of Patent: Mar. 27, 2001

(54) HIERARCHICALLY STRUCTURED INDEXED INFORMATION RETRIEVAL SYSTEM

(75) Inventor: Katsumi Nihei, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/115,540

(22) Filed: Jul. 15, 1998

(30) Foreign Application Priority Data

Jul. 15, 1997 (JP) .................................................. 9-205278

(51) Int. Cl.[7] .................................................. G06F 17/30
(52) U.S. Cl. .................................. 707/3; 707/5; 707/100
(58) Field of Search .................................. 707/3, 5, 100

(56) References Cited

U.S. PATENT DOCUMENTS

| | | | |
|---|---|---|---|
| 5,257,365 | * 10/1993 | Powers et al. | 707/100 |
| 5,359,724 | * 10/1994 | Earle | 707/205 |
| 5,692,175 | * 11/1997 | Davies et al. | 707/3 |
| 5,701,467 | * 12/1997 | Freeston | 707/100 |
| 5,767,854 | * 6/1998 | Anwar | 345/355 |

FOREIGN PATENT DOCUMENTS

| | | |
|---|---|---|
| 53-51028 | 5/1978 | (JP) . |
| 63-251836 | 10/1988 | (JP) . |

(List continued on next page.)

OTHER PUBLICATIONS

J.R. Quilan, "Induction of Decision Trees", Machine Learning, 1986, pp. 81–106.
Radding, Alan ("Is OLAP the answer?", Computerworld, Dec. 19, 1994, pp. 1–4).*
Eckerson, Wayne ("Drilling for data", Computerworld, Dec. 2, 1996, pp. 1–4).*

*Primary Examiner*—Paul R. Lintz
(74) *Attorney, Agent, or Firm*—Sughrue, Mion, Zinn, Macpeak & Seas, PLLC (57) ABSTRACT

An information retrieval system is provided to retrieve through a retrieval object database storing retrieval object data so as to obtain retrieval result data. In accordance with a retrieval condition which is expressed by a logical expression or else and is input by a user, the information retrieval system produces the retrieval result data in consideration of hierarchically-structured indexes which have nodes and leaves arranged in a tree structure, wherein each of the leaves has an index for the retrieval object data. Then, the retrieval result data are narrowed down in accordance with prescribed procedures. Herein, the system obtains question nodes corresponding to common nodes commonly connected with leaves pointing to the retrieval result data while obtaining answer nodes to the question nodes. The question nodes and answer nodes are visually presented for the user in an order determined by occurrence probabilities representing occurrence of the retrieval object data within the retrieval result data. So, the retrieval result data are narrowed down to match with the answer node which is selected by the user and which is provided for the question node selected by the user. Incidentally, main functions of the information retrieval system can be actualized on the computer in accordance with programs, recorded on recording media, in association with storage unit storing the database.

8 Claims, 8 Drawing Sheets

FOREIGN PATENT DOCUMENTS

| | | |
|---|---|---|
| 63-282569 | 11/1988 | (JP) . |
| 1-219927 | 9/1989 | (JP) . |
| 1-239628 | 9/1989 | (JP) . |
| 3-85638 | 4/1991 | (JP) . |
| 3-174654 | 7/1991 | (JP) . |
| 4-39774 | 2/1992 | (JP) . |
| 4-114277 | 4/1992 | (JP) . |
| 4-145578 | 5/1992 | (JP) . |
| 5-120338 | 5/1993 | (JP) . |
| 5-174064 | 7/1993 | (JP) . |
| 6-44113 | 2/1994 | (JP) . |
| 6-68159 | 3/1994 | (JP) . |
| 7-28687 | 1/1995 | (JP) . |
| 7-44576 | 2/1995 | (JP) . |
| 7-65020 | 3/1995 | (JP) . |
| 7-129623 | 5/1995 | (JP) . |
| 7-175820 | 7/1995 | (JP) . |
| 8-147322 | 6/1996 | (JP) . |
| 8-255166 | 10/1996 | (JP) . |
| 8-341945 | 12/1996 | (JP) . |
| 9-54778 | 2/1997 | (JP) . |
| 9-153053 | 6/1997 | (JP) . |
| 9-160931 | 6/1997 | (JP) . |

* cited by examiner

FIG.2

| ID | PLANT NAME | KEYWORD | DESCRIPTION |
|---|---|---|---|
| 1 | AMERICA-SENDAN-GUSA | QUADRILATERAL | HEIGHT OF STALK: 50-150 cm, CUT END: QUADRILATERAL ... |
| 2 | AKAMI-TANPOPO | TANPOPO | VERY SIMILAR TO SEIYOU-TANPOPO, TOTALLY ... |

| ID | RETRIEVAL TIMES |
|---|---|
| 1 | 4 |
| 2 | 1 |
| 3 | 2 |
| ⋮ | ⋮ |

250a — ID column
250b — RETRIEVAL TIMES column
250

HIERARCHICALLY STRUCTURED INDEXED INFORMATION RETRIEVAL SYSTEM

BACKGROUND OF THE INVENTION

1. Field of the Invention

This invention relates to information retrieval systems that retrieves data from databases. Particularly, this invention relates to the information retrieval system that uses hierarchically-structured indexes for the retrieving to efficiently narrow down retrieval results. This application is based on patent application No. Hei 9-205278 filed in Japan, the content of which is incorporated herein by reference.

2. Description of the Related Art

In general, the conventional information retrieval systems are designed to operate based on retrieval conditions, which are input by users. For example, when the user inputs retrieval conditions in the form of logical expressions, the conventional information retrieval system retrieves through a retrieval object database storing retrieval object data, which should be retrieved by the system. So, the conventional system provides the user with the retrieval object data, which match with the retrieval conditions. In some case, however, a number of retrieval result data becomes extremely large in response to some retrieval condition(s) input by the user. In such a case, it is necessary to narrow down the retrieval result data. In order to do so, a first example of the conventional information retrieval system requires inputting of a new retrieval condition for narrowing down the retrieval result data, which should be newly created and input by the user.

The paper of Japanese Patent Application, Publication No. Hei 4-114277 discloses a second example of the conventional information retrieval system, that is, an information retrieval device which is designed as follows:

Hierarchically-structured indexes are presented for the user. So, the user selects a node of the hierarchically-structured indexes, based on which the system performs retrieving on retrieval object data.

As described above, the first example of the conventional information retrieval system requires creation of the new retrieval condition by the user in order to narrow down the retrieval result data. So, there is a problem that the creation of the new retrieval condition is troublesome for the user. Particularly, a person such as a beginner who is not accustomed to the computer retrieving so much is not skilled in determination of retrieval conditions by which retrieval result data can be narrowed down. For this reason, such a person should add or delete the retrieval conditions by trial and error to narrow down the retrieval result data, which causes great load in working.

In contrast, the second example of the conventional information retrieval system is capable of performing retrieving of data by merely selecting nodes of the hierarchically-structured indexes, which are presented for the user. So, it is possible to reduce load to the user in working. However, there is a trouble in the case where multiple nodes matching with the object data exist in the same hierarchical level. In such a case, the user cannot make determination of the node within the multiple nodes that provide a most efficient way for narrowing down the retrieval result data. So, there is a problem that a number of the retrieval result data should be extremely large with respect to some node that is selected by the user.

SUMMARY OF THE INVENTION

It is an object of the invention to provide an information retrieval system that is capable of efficiently narrowing down retrieval result data with a reduced load to a user in working.

An information retrieval system of this invention is designed to retrieve through a retrieval object database storing retrieval object data so as to obtain retrieval result data. In accordance with a retrieval condition which is expressed by a logical expression or else and is input by a user, the information retrieval system produces the retrieval result data in consideration of hierarchically-structured indexes which have nodes and leaves arranged in a tree structure, wherein each of the leaves has an index for the retrieval object data. Then, the retrieval result data are narrowed down in accordance with procedures as follows:

The system obtains question nodes corresponding to common nodes commonly connected with leaves pointing to the retrieval result data while obtaining answer nodes to the question nodes. The question nodes and answer nodes are visually presented for the user in an order determined by occurrence probabilities representing occurrence of the retrieval object data within the retrieval result data. So, the retrieval result data are narrowed down to match with the answer node which is selected by the user and which is provided for the question node selected by the user.

Incidentally, it is possible to efficiently narrow down the retrieval result data by dividing the set of the retrieval result data into partial sets by answer nodes connected with a question node that maximizes an expected gain of an information gain, for example.

Moreover, main functions of the information retrieval system can be actualized on the computer in accordance with programs, recorded on recording media, in association with the storage unit storing the database.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

Figure 1:
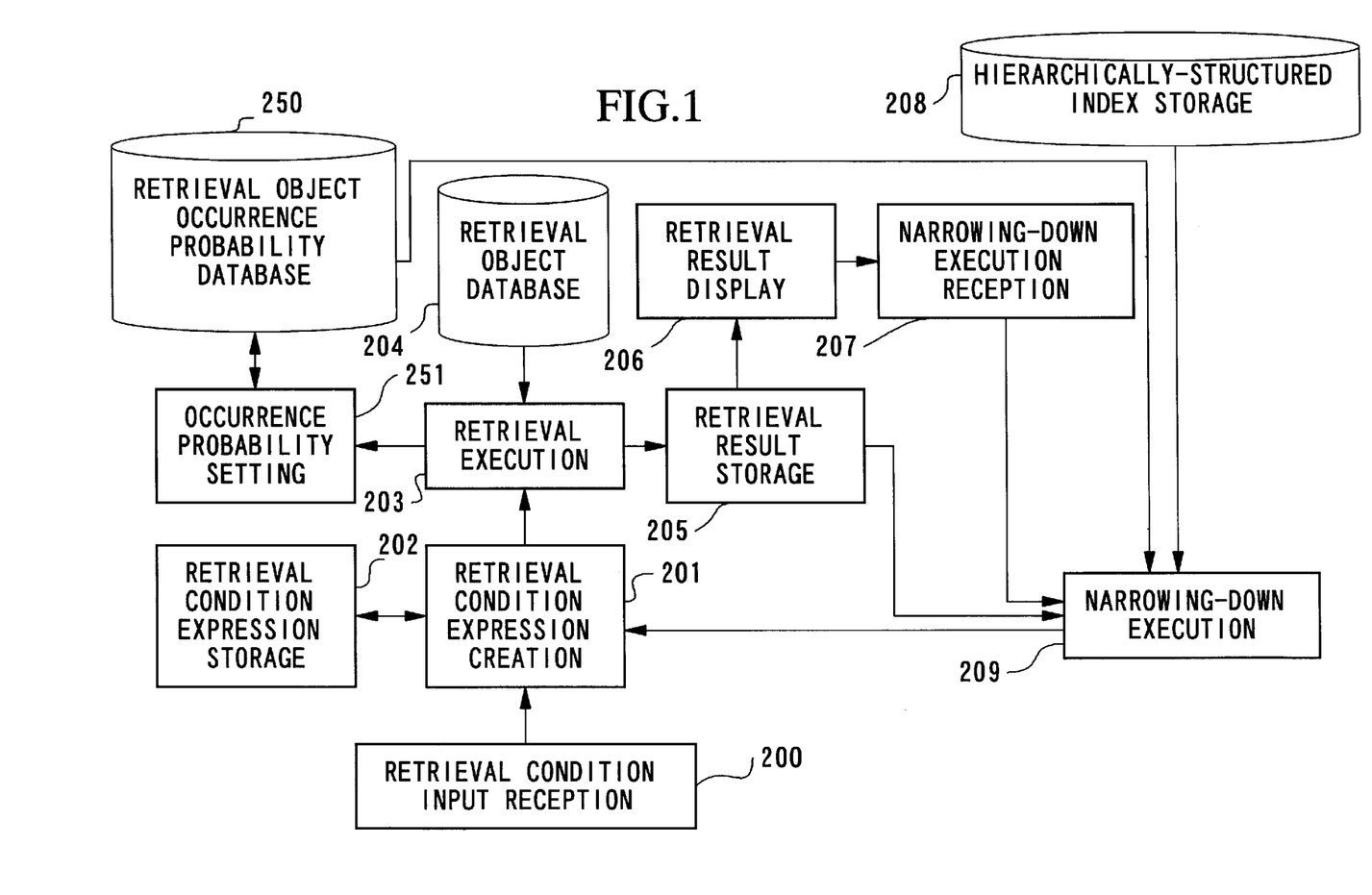
FIG. 1 is a block diagram showing a preferred embodiment of an information retrieval system according to this invention.

FIG. 1 is a block diagram showing a preferred embodiment of an information retrieval system according to this invention. The information retrieval system of FIG. 1 is configured by a retrieval condition input reception unit 200, a retrieval condition expression creation unit 201, a retrieval condition expression storage unit 202, a retrieval execution unit 203, a retrieval object database 204, a retrieval result storage unit 205, a retrieval result display unit 206, a narrowing-down execution reception unit 207, a hierarchically-structured index storage unit 208 and a narrowing-down execution unit 209 as well as a retrieval object occurrence probability database 250 and an occurrence probability setting unit 251.

Figure 2:
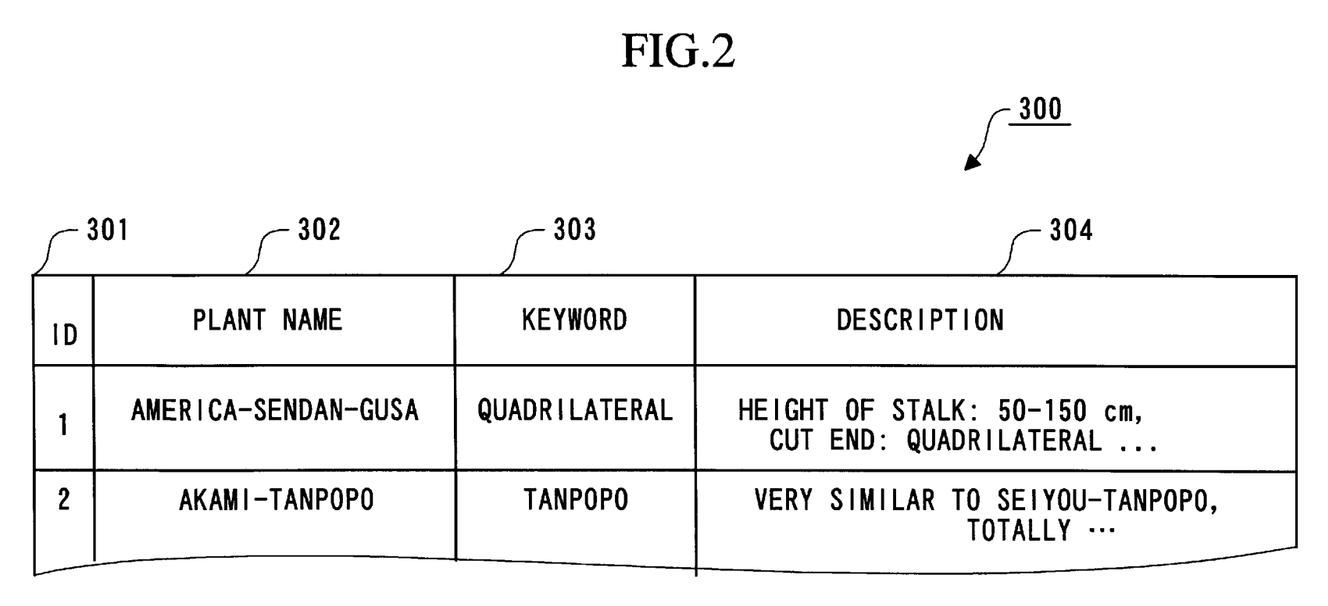
FIG. 2 shows an example of content of a plant table, which is stored in a retrieval object database shown in FIG. 1.

The retrieval object database 204 stores multiple sets of retrieval object data. For example, data regarding plants are stored in a relational database as shown in FIG. 2. Herein, the data are stored in a plant table 300 with being classified into several items, such as "ID" (i.e., identification number) 301, "Plant Name" 302, "Keyword" 303 and "Description" 304. For example, "2" of "ID" provides description with regard to "Tanpopo", which is a Japanese word corresponding to "Dandelion" in English.

Figure 3:
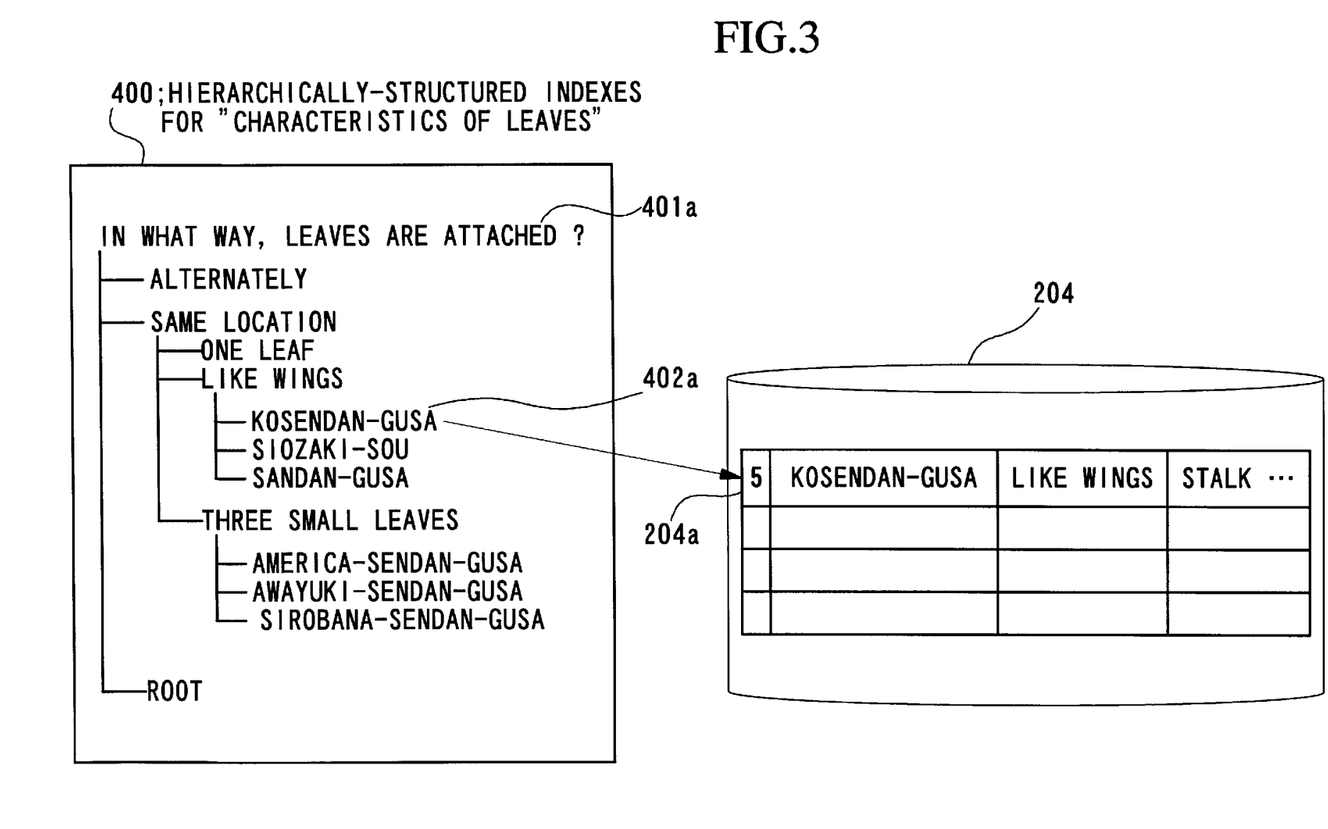
FIG. 3 shows an example of contents of hierarchically-structured indexes.

The hierarchically-structured index storage unit 208 stores hierarchically-structured indexes for the retrieval object database 204. For example, if the data regarding the plants (i.e., plants data) are stored in the retrieval object database 204, hierarchically-structured indexes as shown in FIG. 3 are stored in the hierarchically-structured index storage unit 208. In the case of FIG. 3, the plants data are subjected to hierarchical classification in an aspect of "characteristics of leaves" 400 so as to produce hierarchically-structured indexes. Reference symbol 401a designates an example of a node, which is described by a question; "in what way, the leaves are attached to the plants". Such a node has other nodes or leaves at its lower level of hierarchy. That is, the node corresponds to classification content, which is used to perform hierarchical classification in a certain aspect with respect to retrieval object nodes. Reference symbol 402a designates an example of a leaf, which describes "Kosendan-gusa" (i.e., a name of a plant in Japanese). This leaf does not have other nodes or other leaves at its lower level of hierarchy. But, the leaf 402a has an index which is connected with retrieval object data 204d. In general, multiple aspects are provided for classification of the retrieval object data. As for aspects which are provided for classification of data regarding plants, there are provided "characteristics of leaves" and "height of stalk", for example. Therefore, multiple hierarchically-structured indexes can be provided for each different aspect.

Figure 4:
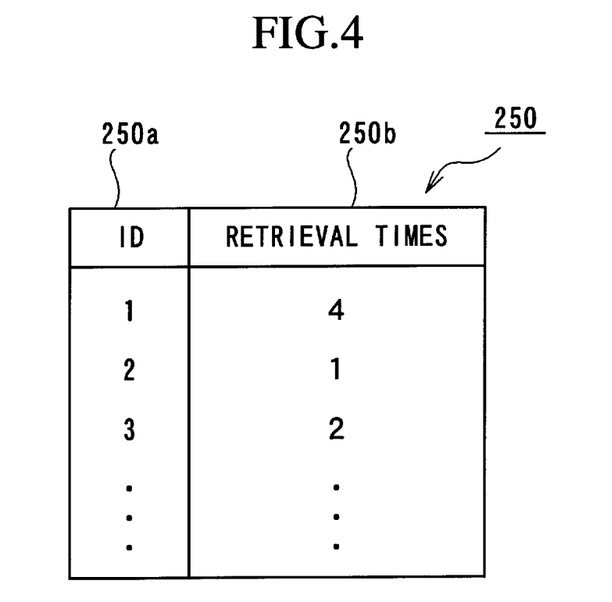
FIG. 4 shows an example of content of a retrieval object occurrence probability database shown in FIG. 1.

The retrieval object occurrence probability database 250 stores a number of times to perform retrieving with respect to each retrieval object data, wherein "a number of times to retrieve" will be represented by "retrieval times". FIG. 4 shows an example of content of the retrieval object occurrence probability database 250. So, data regarding retrieval object occurrence probabilities are stored in the database 250 by being classified into two items, i.e., "ID" 250a and "Retrieval Times" 250b.

The retrieval condition input reception unit 200 receives retrieval conditions given from a user. As for the retrieval condition, it is possible to employ a combination form representing a combination of keywords using a logical expression, such as "Dandelion OR White", for example.

The retrieval condition expression creation unit 201 inputs retrieval conditions received by the retrieval condition input reception unit 200 as well as retrieval condition expressions stored in the retrieval condition expression storage unit 202. So, the retrieval condition expression creation unit 201 connects the retrieval conditions and retrieval condition expressions by using expressions of logical sum and/or logical product so as to create retrieval condition expressions, which can be subjected to retrieval execution. For example, if the retrieval object database 204 is stored in the form of the relational database, the retrieval condition expressions are expressed by "SQL" (i.e., Structured Query Language), which is the standard language used for inquiries to the relational database. In addition, the retrieval condition expression creation unit 201 creates retrieval condition expressions, which are used to perform retrieving on retrieval object data represented by an index that is passed thereto from the narrowing-down execution unit 209.

Suppose an example that the retrieval condition expression storage unit 202 stores a retrieval condition expression, which is represented as follows:

"SELECT*FROM PLANT WHERE KEYWORD=QUADRILATERAL"

The above SQL expression instructs the system to retrieve data, which match with "quadrilateral" in the field of "keyword", from the table "plant". In this case, if a keyword of a retrieval condition that is received by the retrieval condition input reception unit 200 indicates "Tanpopo" (i.e., "dandelion" in English), the retrieval condition expression creation unit 201 creates a retrieval condition expression, which is represented as follows:

"SELECT*FROM PLANT WHERE KEYWORD=QUADRILATERAL OR KEYWORD=TANPOPO"

The above SQL expression instructs the system to retrieve data, which match with "quadrilateral" or "tanpopo" in the field of "keyword", from the table "plant". Herein, the retrieval condition expression storage unit 202 uses the expression of logical sum to create the above retrieval condition expression by connecting the retrieval condition expression stored in the retrieval condition expression storage unit 202 and the retrieval condition received by the retrieval condition input reception unit 200 together. However, the present embodiment is not necessarily limited in utilization of the logical sum, so it is possible to use the logical product for integration of the retrieval condition expression and retrieval condition.

The retrieval condition expression storage unit 202 stores retrieval condition expressions created by the retrieval condition expression creation unit 201. Incidentally, in the initial state, stored content of the retrieval condition expression storage unit 202 is empty.

The retrieval execution unit 203 executes retrieval on the retrieval object database 204 on the basis of the retrieval condition expressions created by the retrieval condition expression creation unit 201. For example, if the retrieval object database 204 stores data in the form of the relational database, the retrieving can be executed by merely issuing the retrieval condition expressions to a relational database management system (not shown).

Based on retrieval result of the retrieval execution unit 203, the occurrence probability setting unit 251 adds "1" to a number of retrieval times. Such addition is performed with respect to the number of retrieval times, which is stored in the occurrence probability database 250 with regard to retrieval object data represented by the aforementioned retrieval result.

The retrieval result storage unit 205 stores the retrieval result, which is obtained by the retrieval execution unit 203.

Figure 5:
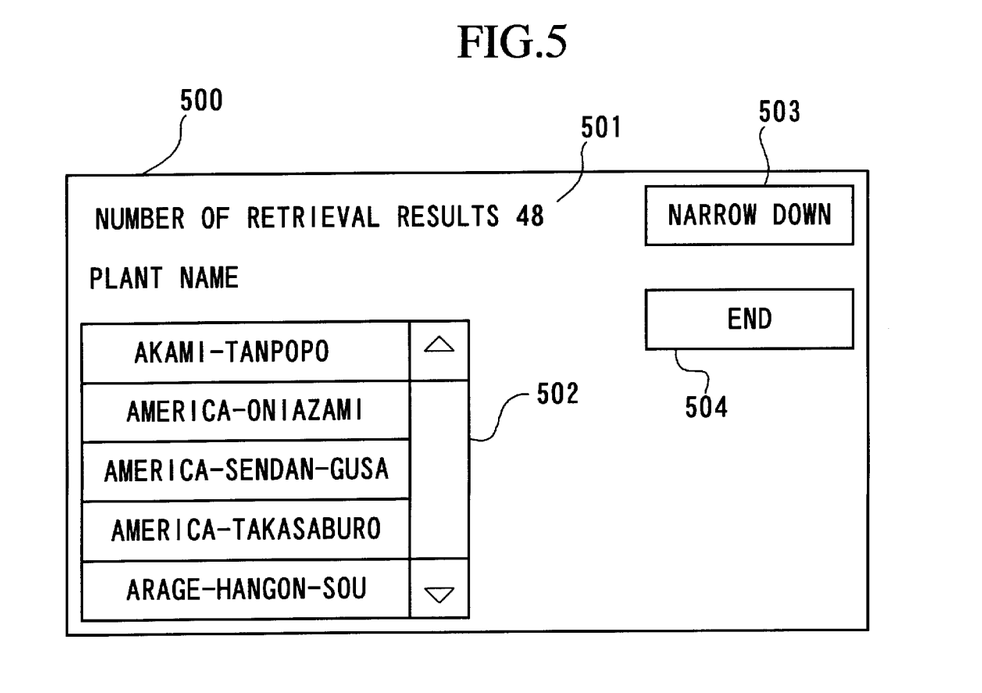
FIG. 5 shows an example of a display screen which visually displays retrieval results.

The retrieval result display unit 206 uses graphical user interfaces of the computer to visually display the retrieval result, stored in the retrieval result storage unit 205, on a screen thereof. FIG. 5 shows an example of visual presentation of the retrieval results. This shows one example of an image of a display screen 500, which is produced when the system performs retrieving with respect to the data regarding the plants. Herein, reference symbol 501 designates a number of retrieval results corresponding to a number of retrieved plants; 502 designates a list of names of the retrieved plants; 503 designates a button for narrowing down (or "narrow-down button"); and 504 designates a button for end of processing (or "end button").

The user is capable of giving an instruction to the system to start narrowing down the retrieval results displayed on the display screen 500 shown in FIG. 5. When receiving such an instruction, the narrowing-down execution unit 207 starts operation of the narrowing-down execution unit 209. That is, when the user uses a mouse to select (or click) the narrow-down button 503 on the display screen 500, the system starts the narrowing-down execution unit 209.

Processing of the narrowing-down execution unit 209 will be described with reference to a flowchart of FIG. 6 as well as FIG. 7A and FIG. 7B. Suppose an example that retrieval object data correspond to data regarding plants while the hierarchically-structured index storage unit 208 stores two series of hierarchically-structured indexes with regard to the plants as shown in FIG. 7. Specifically, FIG. 7A shows hierarchically-structured indexes 600 with regard to "shapes of leaves", while FIG. 7B shows hierarchically-structured indexes 650 with regard to "habitats".

The hierarchically-structured indexes 600 regarding "shapes of leaves" has leaves 602a to 602f as indexes for the retrieval object data, while the hierarchically-structured indexes 650 regarding "habitats" has leaves 652a to 652f as indexes for the retrieval object data. Incidentally, the leaves 652c and 652g correspond to indexes which are provided for the same retrieval object data (i.e., "Awayuki-sendan-gusa", a Japanese name of a certain plant).

The following description uses terms of "question node" and "answer node", which will be explained below.

Suppose hierarchically-structured indexes which contains leaves pointing to retrieval result data obtained through retrieving, which exist in different levels of hierarchy. In such hierarchically-structured indexes, the system travels up the hierarchy from all of the leaves pointing to the retrieval result data so as to firstly reach a common node, which is referred to as a question node. On the other hand, in the above hierarchically-structured indexes, the system travels up the hierarchy from all of the leaves pointing to the retrieval result data so as to reach the question node, whose lower level node is referred to as an answer node. That is, the answer node is located one level of hierarchy below the question node.

Suppose an example that four retrieval results such as names of plants of "Sirobana-sendan-gusa", "America-sendan-gusa", "Siozaki-sou" and "Sendan-gusa" are obtained through the retrieving as retrieval result data. In such an example, a question node for the above four retrieval results in the hierarchically-structured indexes 650 is a node 651a representing "Habitats". Specifically, leaves 652a, 652b, 652e and 652f point to the above four retrieval result data respectively, so if the system travels up the hierarchy from those leaves, the system firstly reaches a common node 651a representing "Habitats". Thus, the question node for those leaves corresponds to the node 651a representing "Habitats". An answer node is located on a path that the system travels up the hierarchy. Herein, answer nodes are nodes which are located one level of hierarchy below the question node 651a, i.e., a node 651b representing "Grassland", a node 651d representing "marshland" and a node 651h representing "wasteland".

Suppose another example that the system obtains two retrieval results representing names of plants of "Kosendan-gusa" and "Siozaki-sou". In such an example, a question node in the hierarchically-structured indexes 650 is the node 651d representing "marshland". So, an answer node, which is located one level of hierarchy below the question node, corresponds to a node 651e representing "rice field", a node 651e representing "riverside" and a node 651g representing "bogland".

Next, the processing of the narrowing-down execution unit 209 will be described with reference to the flowchart of FIG. 6. Suppose an example that the retrieval execution unit 203 performs retrieving to retrieve six data regarding plants such as "America-sendan-gusa", "Sirobana-sendan-gusa", "Awayuki-sendan-gusa", "Kosendan-gusa", "Siozaki-sou" and "Sendan-gusa", so that the corresponding retrieval results are stored in the retrieval result storage unit 205.

Figure 6:
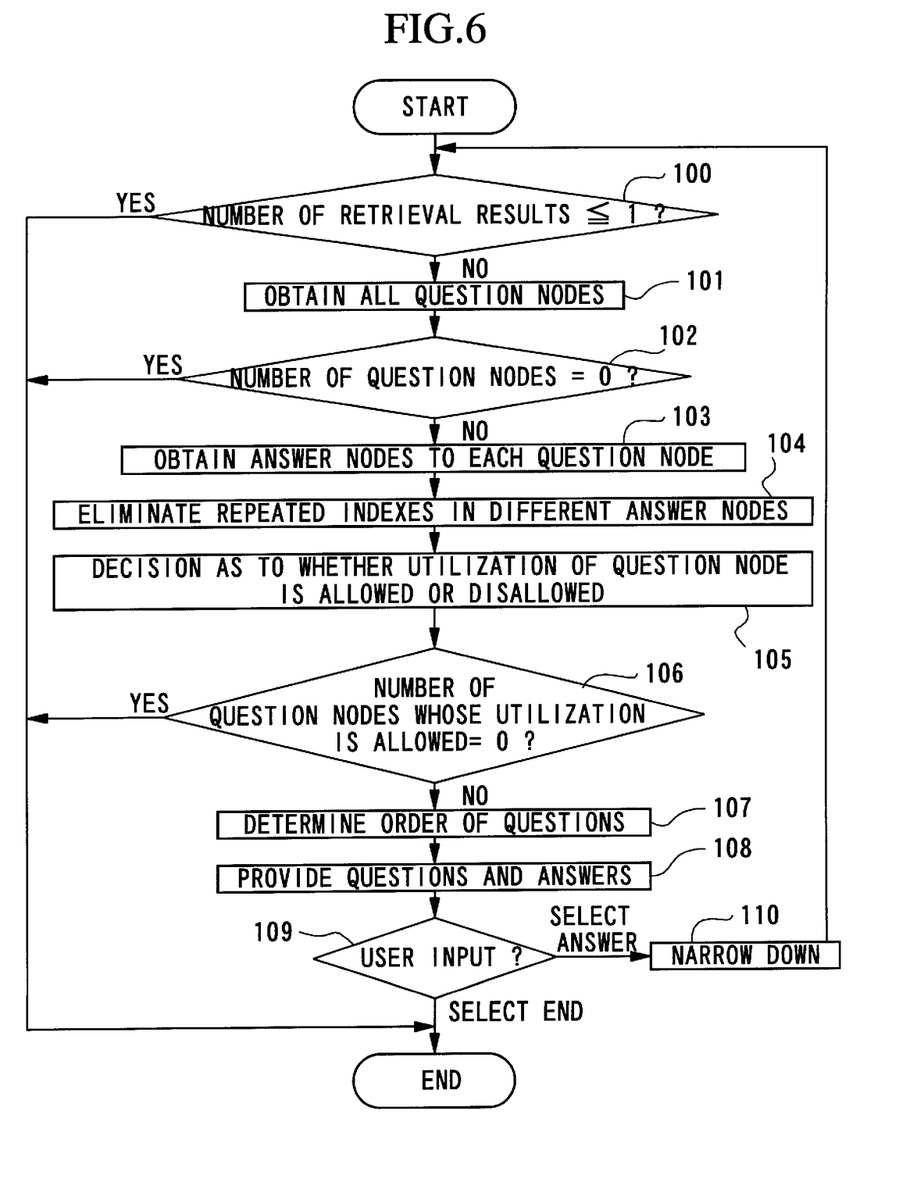
FIG. 6 is a flowchart showing processes of a narrowing-down execution unit shown in FIG. 1.
Figure 7A:
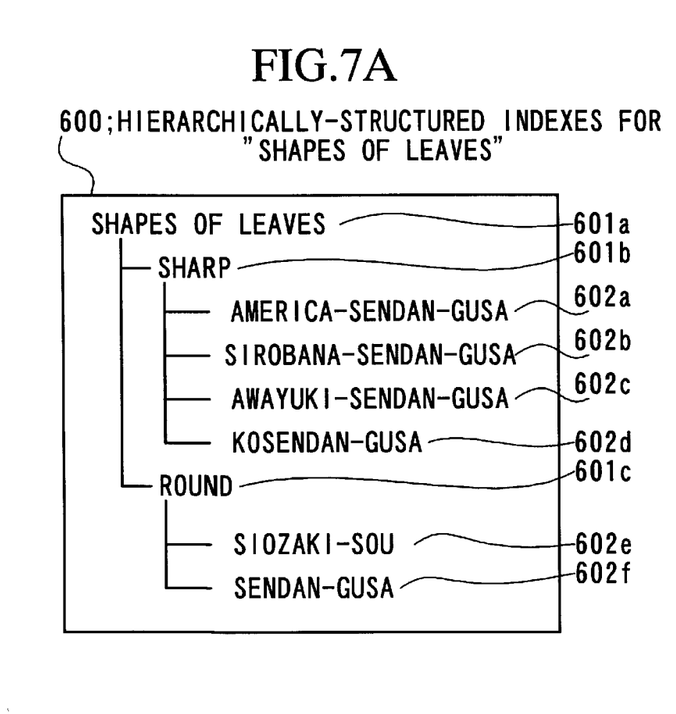
FIG. 7A shows an example of content of hierarchically-structured indexes regarding shapes of leaves.
Figure 7B:
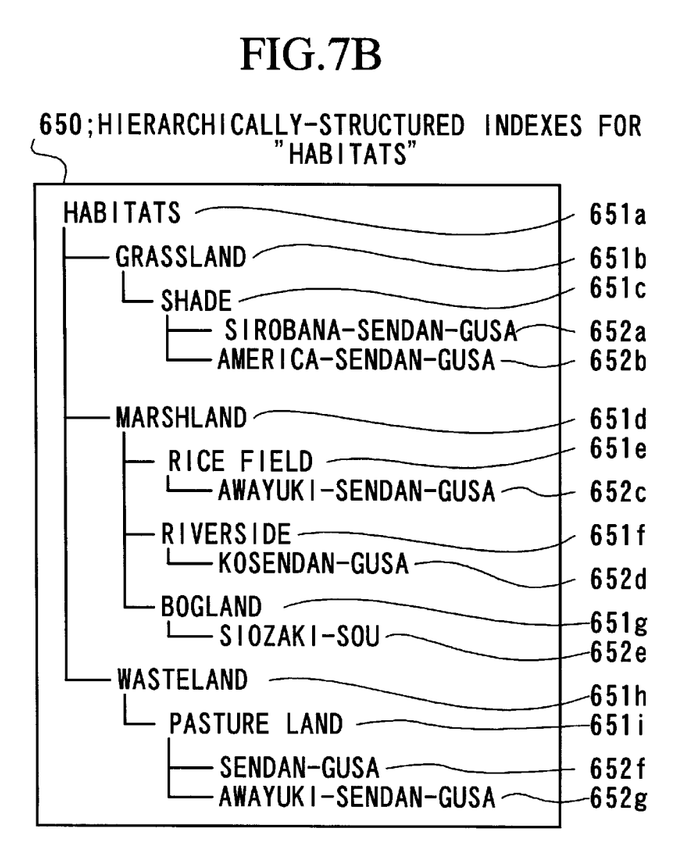
FIG. 7B shows an example of content of hierarchically-structured indexes regarding habitats.

In such an example, the narrowing-down execution unit 209 proceeds firstly to step 100 shown in FIG. 6, wherein a decision is made as to whether a number of retrieval results stored in the retrieval result storage unit 205 is one or less or not. If the number of the retrieval results is one or less, the narrowing-down execution unit 209 terminates the processing thereof. If not, the narrowing-down execution unit 209 (hereinafter, simply referred to as the unit 209) transfers control to step 101.

In step 101, the unit 209 obtains all of question nodes from the hierarchically-structured index storage unit 208. In the case of the hierarchically-structured indexes 600 shown in FIG. 7A, the question node corresponds to the node 601a representing "shapes of leaves". In the case of the hierarchically-structured indexes 650 shown in FIG. 7B, the question node corresponds to the node 651a representing "habitats".

In step 102, a decision is made as to whether a number of the question nodes obtained in step 101 is zero or not. If the number of the question nodes is zero, the unit 209 terminates the processing thereof. If not, the unit 209 transfers control to step 103.

In step 103, the unit 209 obtains answer nodes with respect to each of the question nodes, which are obtained in step 101. In the case of FIG. 7A, two answer nodes, i.e., a node 601b representing "sharp" and a node 601c representing "round", are provided with respect to the question node 601a representing "shapes of leaves". In the case of FIG. 7B, three answer nodes, i.e., the node 651b representing "grassland", the node 651d representing "marshland" and the node 651h representing "wasteland", are provided with respect to the question node 651a representing "habitats".

In step 104, the unit 209 eliminates repeated indexes of the answer nodes, which are obtained with respect to each of the question nodes obtained in step 101. Herein, the retrieval results are divided by the answer nodes that correspond to answer choices for the question node. In some case, a same leaf having an index for the same retrieval result data repeatedly appears at different locations, which are placed at lower levels of hierarchy to be respectively lower than different answer nodes obtained for the same question node. In that case, the above answer nodes are used as new question nodes, so that the unit 209 obtains new answer nodes with respect to the new question nodes. This process is repeated until repetition of the same leaf (hereinafter, simply referred to as leaf repetition) disappears.

In FIG. 7A, the answer node 601b representing "sharp", which is obtained with respect to the question node 601a representing "shapes of leaves", provides four leaves representing "America-sendan-gusa", "Sirobana-sendan-gusa", "Awayuki-sendan-gusa" and "Kosendan-gusa" respectively. In addition, another answer node 601c representing "round" provides two leaves representing "Siozaki-sou" and "Sendan-gusa" respectively. So, there is no leaf repetition between the leaves of the answer nodes 601b and 601c.

In FIG. 7B, the answer node 651b representing "grassland", which is obtained with respect to the question node 651a representing "habitats", provides two leave representing "Sirobana-sendan-gusa" and "America-sendan-gusa" respectively. In addition, the answer node 651d representing "marshland" provides three leaves representing "Awayuki-sendan-gusa", "Kosendan-gusa" and "Siozaki-sou" respectively. Further, the answer node 651h representing "wasteland" provides two leaves representing "Sendan-gusa" and "Awayuki-sendan-gusa" respectively. So, there occurs leaf repetition between the above answer nodes. Specifically, a same leaf representing "Awayuki-sendan-gusa" repeatedly appears with respect to the answer node 651d representing "marshland" and the answer node 651h representing "wasteland". Therefore, all of the above answer nodes 651b, 651d and 651h are used as new question nodes, so that new answer nodes are obtained with respect to the new question nodes. Herein, a new answer node 651c representing "shade" is obtained with respect to the new question node 651b representing "grassland". In addition, three new answer nodes, which correspond to a node 651e representing "rice field", a node 651f representing "riverside" and a node 651g representing "bogland", are obtained with respect to the new question node 651d representing "marshland". Further, a new answer node 651i representing "pasture land" is obtained with respect to the new question node 651h representing "wasteland". Thus, it is possible to eliminate the leaf repetition.

In step 105, a decision is made as to whether utilization of the question node is allowed or disallowed. Herein, it is determined that the utilization of the question node is disallowed if all of the leaves having indexes for the retrieval result data with regard to the question node obtained in step 104 belong to the same level of hierarchy and if the level of hierarchy of the question node is located one level of hierarchy above the level of hierarchy of the leaves or is identical to the level of hierarchy of the leaves.

In the case of FIG. 7A, as the leaves having indexes for the retrieval result data regarding the question node 601a representing "shapes of leaves", there are provided the leaf 602a representing "America-sendan-gusa", leaf 602b representing "Sirobana-sendan-gusa", leaf 602c representing "Awayuki-sendan-gusa", leaf 602d representing "Kosendan-gusa", leaf 602e representing "Siozaki-sou" and leaf 602f representing "Sendan-gusa". All of those leaves belong to the same level of hierarchy. Herein, the level of hierarchy of the question node 601a representing "shapes of leaves" is not one level of hierarchy above the level of hierarchy of the leaves nor the same level of hierarchy of the leaves. So, it is determined in step 105 that utilization of the question node is allowed.

In the case of FIG. 7B, as the leaves having indexes for the retrieval result data regarding the question node 651b representing "grassland", there are provided the leaf 652a representing "Sirobana-sendan-gusa" and leaf 652b representing "America-sendan-gusa". Those leaves belong to the same level of hierarchy. However, the level of hierarchy of the question node 651b is not one level of hierarchy above the level of hierarchy of the leaves nor the same level of hierarchy of the leaves. So, it is determined in step 105 that utilization of the question node is allowed.

In addition, as the leaves having indexes for the retrieval result data regarding the question node 651d representing "marshland", there are provided the leaf 652c representing "Awayuki-sendan-gusa", leaf 652d representing "Kosendan-gusa" and leaf 652e representing "Siozaki-sou". Those leaves belong to the same level of hierarchy, however, the level of hierarchy of the question node 651d representing "marshland" is not one level of hierarchy above the level of hierarchy of the leaves nor the same level of hierarchy of the leaves. So, it is determined in step 105 that utilization of the question node is allowed.

Further, as the leaves having indexes for the retrieval result data regarding the question node 651h representing "wasteland", there are provided the leaf 652f representing "Sendan-gusa" and leaf 652g representing "Awayuki-sendan-gusa". Those leaves belong to the same level of hierarchy, however, the level of hierarchy of the question node 651h representing "wasteland" is not one level of hierarchy above the level of hierarchy of the leaves nor the same level of hierarchy of the leaves. So, it is determined in step 105 that utilization of the question node is allowed.

In step 106, the unit 209 performs an end decision. That is, if a number of the question nodes whose utilization is allowed in step 105 is zero, the unit 209 ends the processing thereof. If not, the unit 209 transfers control to step 107.

In step 107, the unit 209 determines an order to present the question nodes for the user. The unit 209 calculates an expected information gain with respect to each of the question nodes. Herein, details of the expected information gain will be described later, wherein the expected information gain is an expected amount of information which is acquired by making the question of the question node. So, the unit sorts the question nodes to be arranged in a decreasing order of the expected information gains. In other words, the unit 209 sorts the question nodes in an order to reduce efficiencies in narrowing-down operations. In the case of FIG. 7B, the question nodes are arranged in an order as follows:

651b "grassland"→651d "marshland"→651h "wasteland"→601a "shapes of leaves".

Figure 8:
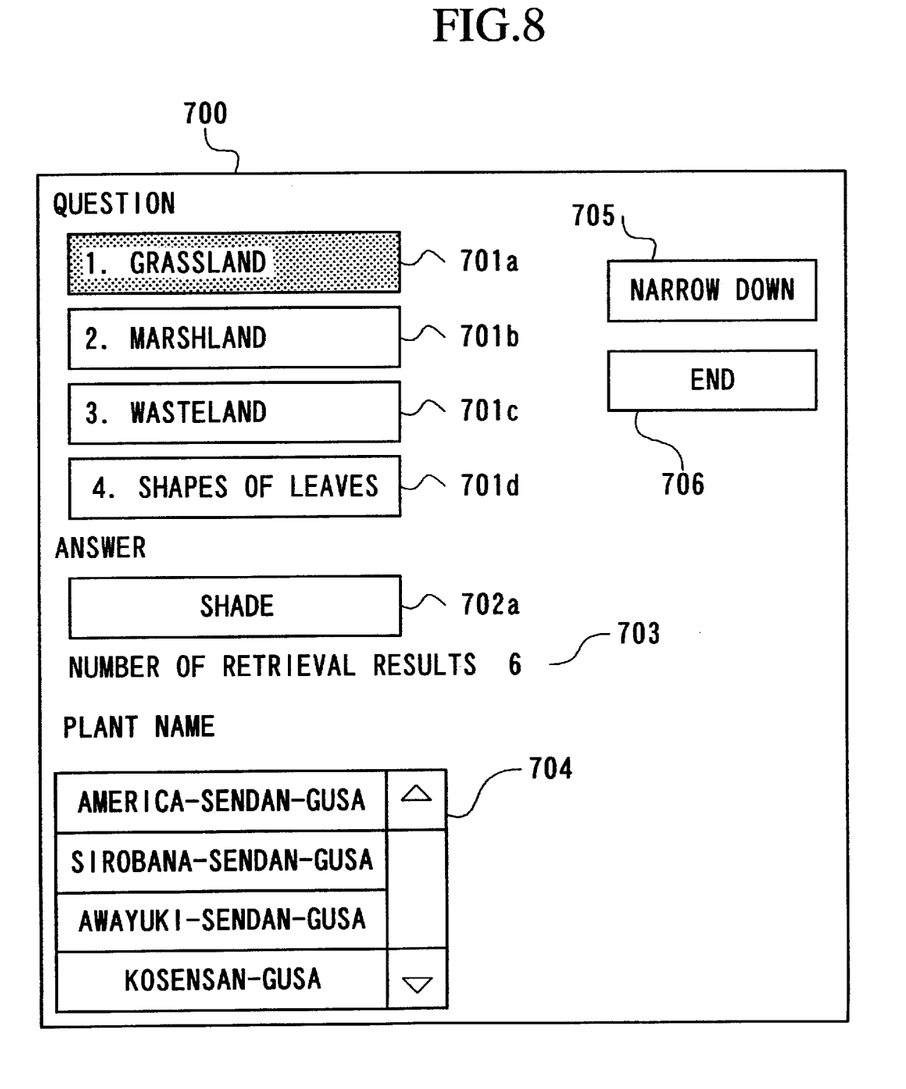
FIG. 8 shows an example of a display screen which visually displays several pieces of information as well as graphical user interfaces when retrieval result data are narrowed down.

In step 108, the unit 209 presents the question nodes and answer nodes to the user in accordance with the order which is determined in step 107. FIG. 8 shows an example of an image of a display screen of the display unit using the graphical user interfaces of the computer. In FIG. 8, the display unit displays four items in blocks 701a to 701d with regard to "Question" while also displaying one item in a block 702a with regard to "Answer". As for "Question", the blocks 701a, 701b, 701c and 701d respectively show "1. Grassland", "2. Marshland", "3. Wasteland" and "4. Shapes of Leaves". As for "Answer", the block 702a shows "Shade", which is an answer to the question 701a representing "1. Grassland". In FIG. 8, reference symbol 703 designates a display section on the screen that displays a number of data retrieved by the retrieval execution unit 203; 704 designates a list of the retrieved plants; 705 designates a narrow-down button; and 706 designates an end button.

In step 109, the unit 209 receives an input from the user. If the user wishes to end the processing, the user selects the end button 706. Thus, the unit 209 ends the processing thereof. On the other hand, if the user wishes to further narrow down the retrieval result data, the user selects one of the answers displayed on the screen of the display unit. In the present embodiment, only the answer "Shade" is displayed on the screen of the display unit. Then, the user selects the narrow-down button 705. If the first question 701*a* is not the effective question to perform the narrowing down, the user selects one of the other questions 701*b* to 701*d* as the effective question to perform the narrowing down. If the user finds both of the second question 701*b* representing "2. Marshland" and the fourth question 701*d* representing "4. Shapes of Leaves" as the effective questions, the user selects one of them, i.e., the second question 701*b* representing "2. Marshland", for example. Thus, the display unit displays answers to the selected question, i.e., "Rice Field", "Riverside" and "Bogland".

In step 110, the unit 209 executes the narrowing down. That is, the unit 209 picks up the leaves 652*a* and 652*b* (see FIG. 7B) that relate to the answer "Shade", which is selected by the user. So, the unit 209 detects indexes for "Sirobana-sendan-gusa" and "America-sendan-gusa", which are set to the leaves 652*a* and 652*b* respectively. Thus, the unit 209 passes those indexes to the retrieval condition expression creation unit 201. After completion of the step 110, the narrowing-down execution unit 209 reverts control to the step 100.

When receiving the indexes for "Sirobana-sendan-gusa" and "America-sendan-gusa" from the narrowing-down execution unit 209, the retrieval condition expression creation unit 201 creates a retrieval condition expression to perform retrieving on them. The retrieval condition expression is passed to the retrieval execution unit 203. Thus, the retrieval execution unit 203 retrieves through the retrieval object database 204. As a result, the display unit displays the screen image as shown in FIG. 5 on the screen thereof. In this case, a number of the retrieval results (see 501) is narrowed down to "2", so the list 502 displays "Sirobana-sendan-gusa" and "America-sendan-gusa".

Next, a description will be given in further detail with respect to a method to determine an order to arrange questions in step 107 (hereinafter, simply referred to as "determination method of question order"). The determination method of question order is based on the expected information gain maximization principle, which is used in "ID3" (J. R. Quinlan, "Induction of Decision Trees", Machine Learning, Vol. 1, pp. 81–106, 1986).

Using a set "C" of the retrieval results stored in the retrieval result storage unit 205 and a number "k" of the retrieval results as well as retrieval result data $r_1, r_2, \ldots, r_k$ for the retrieval object wherein retrieval result data $r_t$ (where $1 \leq t \leq k$) is retrieved by a number $h_t$ of retrieval times, occurrence probability $p^j$ for retrieval object data $r_j$ (where $1 \leq j \leq k$) is given by an equation 1 as follows:

$$p^j = \frac{h_j}{\sum_{i=1}^{k} h_i} \quad \text{[Equation 1]}$$

In addition, an information amount (entropy) M(C) for the set C is given by an equation 2 as follows:

$$M(C) = -\sum_{j=1}^{k} p^j \log_2 p^j \quad \text{[Equation 2]}$$

In accordance with answer nodes $a_1, a_2, \ldots, a_n$ to a certain question node "a", the set C is divided into partial sets $C_1, C_2, \ldots, C_n$, wherein an expected information amount B(C,a) is given by an equation 3 as follows:

$$B(C, a) = \sum_{i=1}^{n} \frac{|C_i|}{|C|} M(C_i) \quad \text{[Equation 3]}$$

Using the above equations, an expected gain "gain(C,a)" of information gain can be calculated by an equation 4 as follows:
[Equation 4]

$$\text{gain}(C,a) = M(C) - B(C,a)$$

By using the question node "a" that maximizes the above gain(C,a), the retrieval result set is subjected to division. Thus, it is possible to efficiently narrow down the retrieval results.

Figure 9:
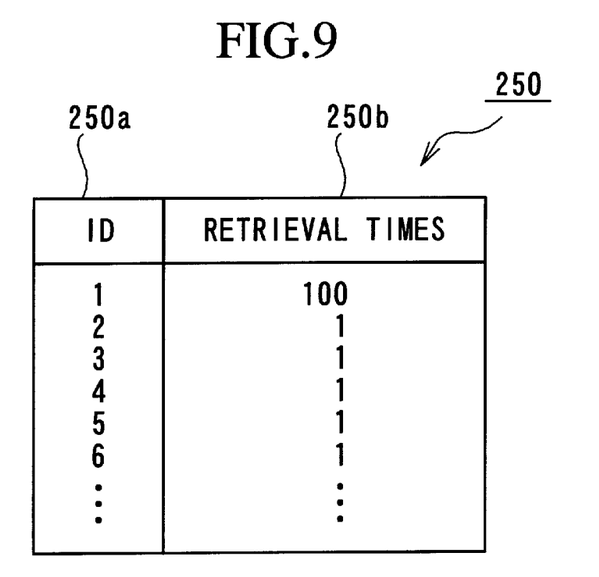
FIG. 9 shows another example of content of the retrieval object occurrence probability database shown in FIG. 1, which is used for calculations.

In order to cope with the hierarchically-structured indexes shown in FIG. 7A and FIG. 7B, the retrieval object occurrence probability database 250 stores an information table as shown in FIG. 9 to perform calculations for occurrence probabilities, for example. FIG. 9 shows numbers "1" to "6" for "ID", wherein "ID=1" represents "America-sendan-gusa", "ID=2" represents Sirobana-sendan-gusa", "ID=3" represents "Awayuki-sendan-gusa", "ID=4" represents "Kosendan-gusa", "ID=5" represents "Siozaki-sou" and "ID=6" represents "Sendan-gusa", for example.

Using the content of the information table of FIG. 9, it is possible to calculate the information amount M(C) for the retrieval result set in accordance with an equation 5 as follows:

$$M(C) = -\left(\frac{100}{105}\log_2\frac{100}{105} + \frac{1}{105}\log_2\frac{1}{105} + \frac{1}{105}\log_2\frac{1}{105} + \frac{1}{105}\log_2\frac{1}{105} + \frac{1}{105}\log_2\frac{1}{105} + \frac{1}{105}\log_2\frac{1}{105}\right) = 0.387 \text{ (bits)} \quad \text{[Equation 5]}$$

Next, an expected information amount B(C,shapes-of-leaves) for the question node 601*a* representing "shapes of leaves" can be calculated as follows:

The question node 601*a* representing "shapes of leaves" has two answer nodes, i.e., the answer node 601*b* representing "sharp" and answer node 601*c* representing "round". Herein, an attribute number is "2"; a number of retrieval results obtained for the answer node 601*b* representing "sharp" is "4"; and a number of retrieval results obtained for the answer node 601*c* representing "round" is "2". Thus, it is possible to calculate an expected information amount B(C,shapes-of-leaves) by an equation 6 as follows:

$$B(C, \text{shapes-of-leaves}) = \frac{103}{105}\left(-\frac{100}{103}\log_2\frac{100}{103} - \frac{1}{103}\log_2\frac{1}{103} - \frac{1}{103}\log_2\frac{1}{103} - \frac{1}{103}\log_2\frac{1}{103}\right) + \frac{2}{105}\left(-\frac{1}{2}\log_2\frac{1}{2} - \frac{1}{2}\log_2\frac{1}{2}\right) = 0.251 \text{ (bits)} \quad \text{[Equation 6]}$$

Similarly, an expected information amount B(C, grassland) for the question node 651*b* representing "grassland" can be calculated by an equation 7 as follows:

$$B(C, \text{grassland}) = \frac{101}{105}\left(-\frac{1}{101}\log_2\frac{1}{101} - \frac{100}{101}\log_2\frac{100}{101}\right) + \quad \text{[Equation 7]}$$
$$\frac{4}{105}\left(-\frac{1}{4}\log_2\frac{1}{4} - \frac{1}{4}\log_2\frac{1}{4} - \frac{1}{4}\log_2\frac{1}{4} - \frac{1}{4}\log_2\frac{1}{4}\right) =$$
$$0.153\,(\text{bits})$$

An expected information amount B(C,marshland) can be calculated by an equation 8 as follows:

$$B(C, \text{marshland}) = \quad \text{[Equation 8]}$$
$$\frac{1}{105}\left(-\frac{1}{1}\log_2\frac{1}{1}\right) + \frac{1}{105}\left(-\frac{1}{1}\log_2\frac{1}{1}\right) + \frac{1}{105}\left(-\frac{1}{1}\log_2\frac{1}{1}\right) +$$
$$\frac{102}{105}\left(-\frac{100}{102}\log_2\frac{100}{102} - \frac{1}{102}\log_2\frac{1}{102} - \right.$$
$$\left. \frac{1}{102}\log_2\frac{1}{102}\right) = 0.154\,(\text{bits})$$

An expected information amount B(C,wasteland) can be calculated by an equation 9 as follows:

$$B(C, \text{wasteland}) = \frac{2}{105}\left(-\frac{1}{2}\log_2\frac{1}{2} - \frac{1}{2}\log_2\frac{1}{2}\right) + \quad \text{[Equation 9]}$$
$$\frac{103}{105}\left(-\frac{100}{103}\log_2\frac{100}{103} - \frac{1}{103}\log_2\frac{1}{103} - \right.$$
$$\left. \frac{1}{103}\log_2\frac{1}{103} - \frac{1}{103}\log_2\frac{1}{103}\right) = 0.251\,(\text{bits})$$

Next, expected gains for information gains are calculated with respect to the question nodes by equations, which will be described below.

An expected gain "gain(C,shapes-of-leaves)" for the question node 601a representing "shapes of leaves" is calculated by an equation 10 as follows:
[Equation 10]

gain(C,shapes-of-leaves)=M(C)−B(C,shapes-of-leaves)=0.387−
       0.251=0.136(bits)

An expected gain "gain(C,grassland)" for the question node 651b representing "grassland" is calculated by an equation 11 as follows:
[Equation 11]

gain(C,grassland)=M(C)−B(C,grassland)=0.387−0.153=0.234(bits)

An expected gain "gain(C,marshland)" for the question node 651d representing "marshland" is calculated by an equation 12 as follows:
[Equation 12]

gain(C,marshland)=M(C)−B(C,marshland)=0.387−0.154=
       0.233(bits)

An expected gain "gain(C,wasteland)" for the question node 651h representing "wasteland" is calculated by an equation 13 as follows:
[Equation 13]

gain(C,wasteland)=M(C)−B(C,wasteland)=0.387−0.251=0.136(bits)

According to the above calculation results, the above four question nodes are arranged in a decreasing order in expected gains, as follows:

Question node 651b "grassland"→question node 651d "marshland"→question node 651h "wasteland"→question node 601a "shapes of leaves"

In the aforementioned embodiment, the occurrence probability $p^j$ of the retrieval object data $r_j$ is calculated by the aforementioned equation 1. Instead of using the calculated value of the equation 1, it is possible to use a ratio that the retrieval object data $r_j$ exists in the retrieval result set C. In this case, $p^j=\frac{1}{6}$ while $|C|=6$.

Figure 10:
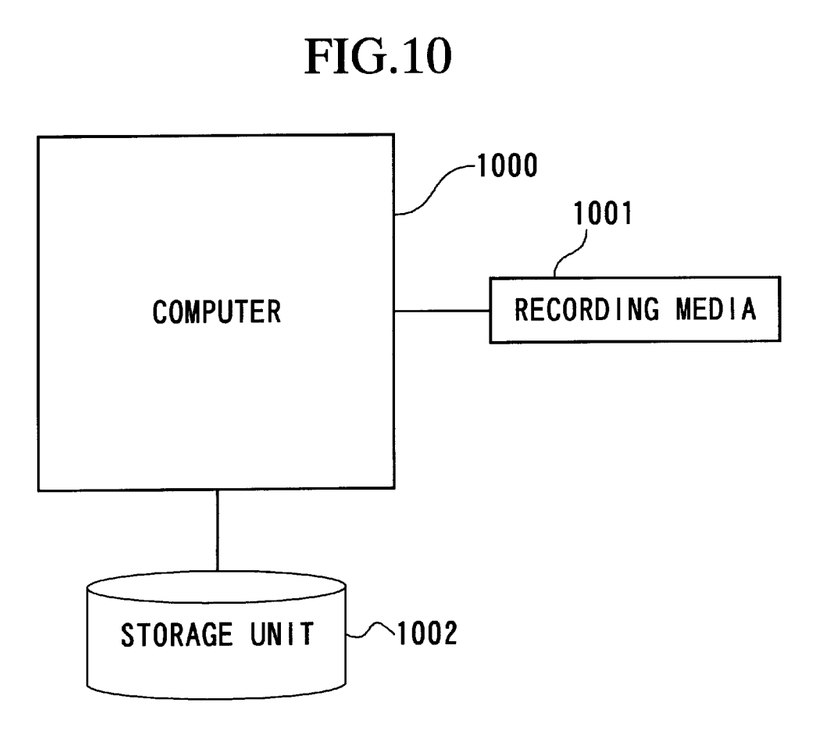
FIG. 10 is a block diagram showing an example of a hardware configuration of the information retrieval system of the invention.

FIG. 10 is a block diagram showing an example of a hardware configuration employed for the information retrieval system of the present invention. There are provided a computer 1000, a recording media 1001 and a storage unit 1002. Herein, the recording media 1001 corresponds to the semiconductor memory, disk or other recording media, which stores programs that cause the computer 1000 to operate as the information retrieval system.

The programs stored in the recording media 1002 are loaded to the computer 1000 to control operations of the computer 1000. Thus, it is possible to actualize functions of the retrieval condition input reception unit 200, retrieval condition expression creation unit 201, retrieval execution unit 203, retrieval result display unit 206, narrowing-down execution reception unit 207, narrowing-down execution unit 209 and occurrence probability setting unit 251 on the computer 1000. In addition, the retrieval object database 204, hierarchically-structured index storage unit 208, retrieval object occurrence probability database 250, retrieval condition expression storage unit 202 and retrieval result storage unit 205 are actualized on the storage unit 1002.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An information retrieval system comprising:
    a retrieval object database for storing a plurality of retrieval object data;
    means for providing hierarchically-structured indexes constructed by a plurality of nodes and a plurality of leaves, wherein each of the plurality of nodes is connected with at least one node and/or at least one leaf which are located one level of hierarchy below therefrom, and
    wherein each of the plurality of leaves has an index of each of the plurality of retrieval object data;
    retrieval execution means for retrieving through the retrieval object database based on a retrieval condition input by a user so as to obtain retrieval result data; and
    narrowing-down execution means for obtaining question nodes corresponding to common nodes commonly connected with leaves pointing to the retrieval result data retrieved by the retrieval execution means within the hierarchically-structured indexes and for obtaining answer nodes that are located at a level of hierarchy just below a level of hierarchy to which each of the question nodes belongs, wherein narrowing-down factors are calculated with respect to the question nodes respectively so that the question nodes are presented for the user in a form that the user is capable of recognizing merits of the narrowing-down factors, whereby the narrowing-down execution means narrows down the retrieval result data on the basis of the answer node that is selected by the user within the answer nodes to the question nodes selected by the user;

an information retrieval system wherein each of the plurality of nodes is set to have content of classification, which is hierarchically performed in a prescribed aspect on the retrieval object data stored in the retrieval object database;

wherein the narrowing-down execution means further comprises first means, activated when leaves pointing to same retrieval result data exist in a level of hierarchy below a level of hierarchy to which the answer nodes belong, for newly obtaining nodes belonging to the same level of hierarchy of the answer nodes as new question nodes and for newly obtaining nodes located at a level of hierarchy just below the level of hierarchy of the new question nodes as new answer nodes, and second means, activated when leaves pointing to retrieval result data related to the new question nodes belong to a same level of hierarchy and when a level of hierarchy of the new question nodes is one level of hierarchy above the level of hierarchy of the leaves or is identical the level of hierarchy of the leaves, for disallowing utilization of the new question nodes.

2. An information retrieval system as defined in claim 1 wherein the narrowing-down execution means further comprises first calculation means for performing a first calculation using a set C of the retrieval result data, a number "k" of the retrieval result data and an occurrence probability $p^j$ indicating a probability of occurrence of retrieval object data j in the set C of the retrieval result data so as to calculate an information amount M(C) of the set C of the retrieval result data in accordance with an equation given as $$M(C) = -\sum_{j=1}^{k} p^j \log_2 p^j,$$

second calculation means for dividing the set C of the retrieval result data into partial sets $C_1, \ldots, C_n$ by answer nodes $a_1, \ldots, a_n$ of a prescribed answer node "a" and for performing a second calculation, with regard to all of the question nodes obtained by the narrowing-down execution means, with respect to an expected information amount B(C,a) by an equation given as $$B(C, a) = \sum_{i=1}^{n} \frac{|C_i|}{|C|} M(C_i), \text{ and}$$

third calculation means for performing a third calculation, with regard to all of the question nodes obtained by the narrowing-down execution means, with respect to an expected gain "gain(C,a)" of an information gain by an equation given as gain(C,a)=M(C)−B(C,a), whereby the narrowing-down factors for the question nodes are produced based on the expected gain "gain(C,a)" of the information gains calculated for the question nodes respectively.

3. An information retrieval system as defined in claim 2 further comprising a retrieval object occurrence probability database storing a number of retrieval times with respect to each of the retrieval object data stored in the retrieval object database, wherein the narrowing-down execution means further comprises fourth calculation means for performing a fourth calculation using retrieval result data $r_1, \ldots, r_k$ and a number "$h_t$" of retrieval times that retrieving is performed on prescribed retrieval object data $r_t$ in accordance with an equation given as $$p^j = \frac{h_j}{\sum_{j=1}^{k} h_j}$$

so as to calculate the occurrence probability $p^j$.

4. A computer program product comprising computer readable instructions to cause a computer to execute said instructions, said instructions comprising instructions for implementing a retrieval object database for storing a plurality of retrieval object data and hierarchically-structured indexes constructed by a plurality of nodes and a plurality of leaves, wherein each of the plurality of nodes is connected with at least one node and/or at least one leave which are located one level of hierarchy below therefrom, and wherein each of the plurality of leaves has an index for each of the plurality of retrieval object data, said instructions further comprising instructions for implementing retrieval execution means for retrieving through the retrieval object database based on a retrieval condition input by a user so as to obtain retrieval result data, and narrowing-down execution means for obtaining question nodes corresponding to common nodes commonly connected with leaves pointing to the retrieval result data retrieved by the retrieval execution means within the hierarchically-structured indexes and for obtaining answer nodes that are located at a level of hierarchy just below a level of hierarchy to which each of the question nodes belongs, wherein narrowing-down factors are calculated with respect to the question nodes respectively so that the question nodes are presented for the user in a form that the user is capable of recognizing merits of the narrowing-down factors, whereby the narrowing-down execution means narrows down the retrieval result data on the basis of the answer node hat is selected by the user within the answer nodes to the question nodes selected by the user, wherein the instructions for implementing the narrowing-down execution means further comprises instructions for implementing first means, activated when leaves pointing to same retrieval result data exist in a level of hierarchy below a level of hierarchy to which the answer nodes belong, for newly obtaining nodes belonging to the same level of hierarchy of the answer nodes as new question nodes and for newly obtaining nodes located at a level of hierarchy just below the level of hierarchy of the new question nodes as new answer nodes, and second means, activated when leaves pointing to retrieval result data related to the new question nodes belong to a same level of hierarchy and when a level of hierarchy of the new question nodes is one level of hierarchy above the level of hierarchy of the leaves or is identical the level of hierarchy of the leaves, for disallowing utilization of the new question nodes.

5. An information retrieval system comprising:

a retrieval object database for storing a plurality of retrieval object data;

retrieval execution means for retrieving through the retrieval object database on the basis of a retrieval condition input by a user so as to obtain retrieval result data;

storage means for storing hierarchically-structured indexes having nodes and leaves which are arranged in a tree structure, wherein each of the leaves has an index for the retrieval object data;

question node means for obtaining question nodes corresponding to common nodes commonly connected with leaves pointing to the retrieval result data within the hierarchically-structured indexes;

answer node means for obtaining answer nodes that are located below a level of hierarchy of each of the question nodes;

occurrence probability calculation means for calculating occurrence probabilities each representing occurrence of prescribed retrieval object data within the retrieval result data;

presentation means for presenting a user with the question nodes in an order determined by the occurrence probabilities; and narrowing means for narrowing down the retrieval result data to match with at least one answer node selected by the user, which is provided for at least one question node selected by the user.

6. An information retrieval system as defined in claim 5 further comprising index repetition eliminating means for eliminating repetition of indexes between different answer nodes, wherein the index repetition eliminating means is activated when a same leaf having an index to same retrieval result data exists repeatedly below answer nodes connected with a same question node and wherein the index repetition eliminating means comprises new question node means for obtaining new question nodes corresponding to the answer nodes below which the same leaf repeatedly exists, and new answer node means for obtaining new answer nodes with respect to each of the new question nodes.

7. An information retrieval system as defined in claim 5 or 6 further comprising utilization decision means for making a decision as to whether utilization of the question node is allowed or disallowed, wherein it is determined that utilization of the question node is disallowed when all of leaves having indexes for retrieval result data regarding the question node belong to a same level of hierarchy and when a level of hierarchy of the question node is one level of hierarchy above the level of hierarchy of the leaves or is identical to the level of hierarchy of the leaves.

8. An information retrieval system as defined in claim 5 further comprising calculation means for calculating an information amount "M(C)" for a set C of the retrieval result data and expected information amount "B(C,a)" for partial sets $C_1, \ldots, C_n$ that are produced by dividing the set C by answer nodes $a_1, \ldots, a_n$ of a prescribed question node "a" as well as expected gains "gain(C,a)" of information gains where gain(C,a)=M(C)−B(C,a), wherein the narrowing means narrowing down the retrieval result data by dividing the set C of the retrieval result data in accordance with the question node "a" that maximizes the expected gain "gain (C,a)".

* * * * *